3,011,011
BUS DUCTS AND INSULATORS THEREFOR
Paul M. Christensen, West Orange, N.J., assignor to Federal Pacific Electric Company, a corporation of Delaware
Filed Sept. 26, 1955, Ser. No. 536,324
9 Claims. (Cl. 174—99)

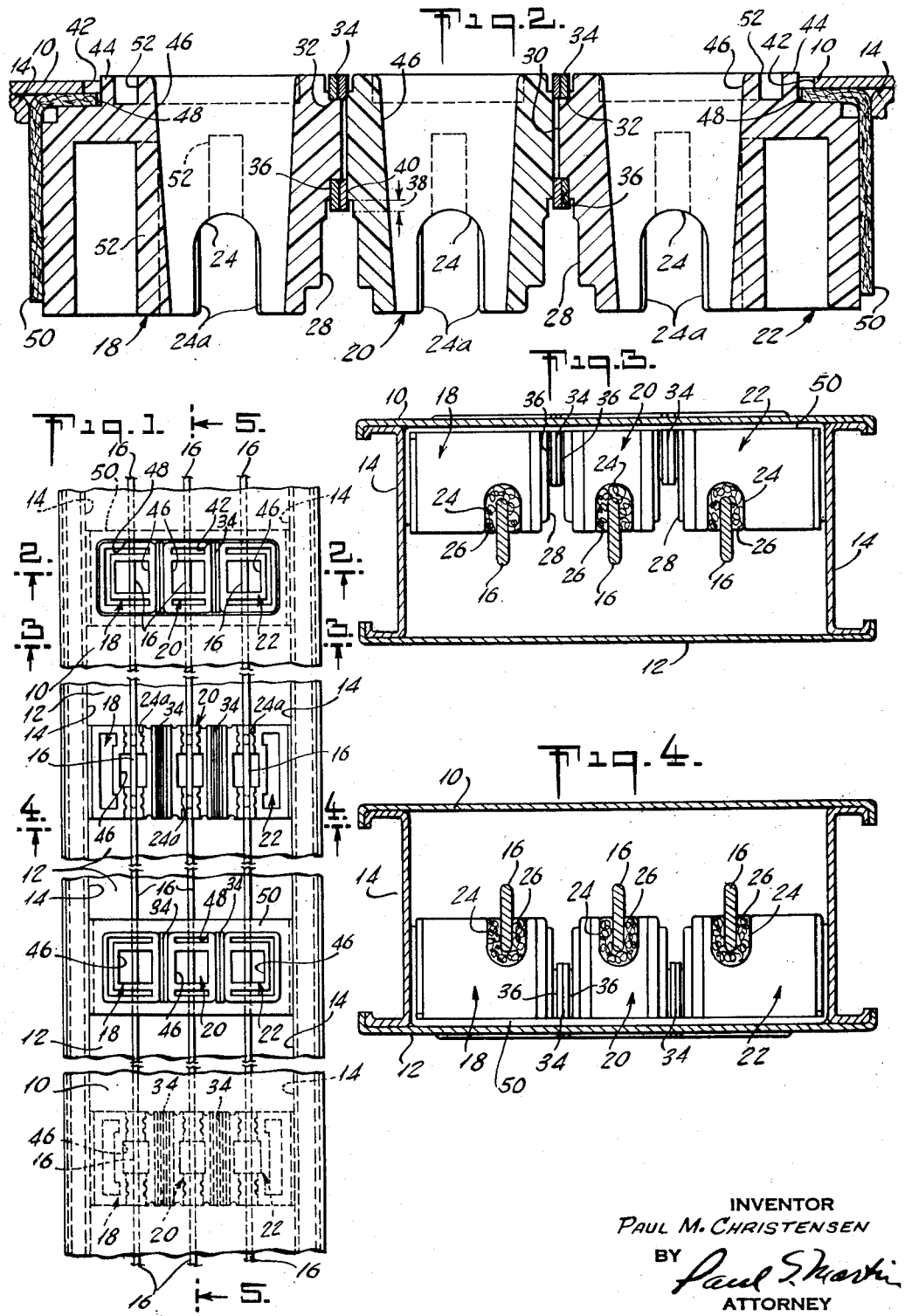

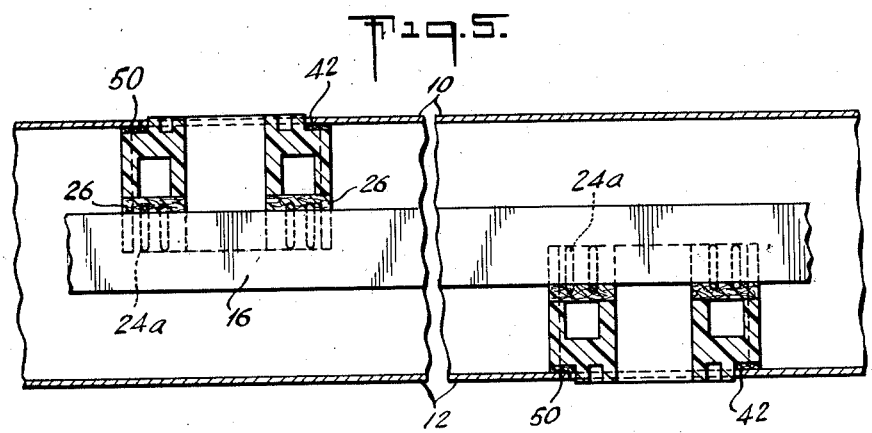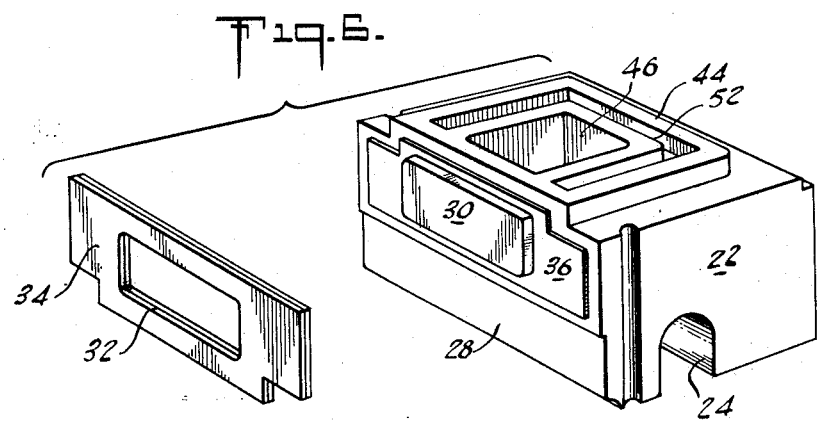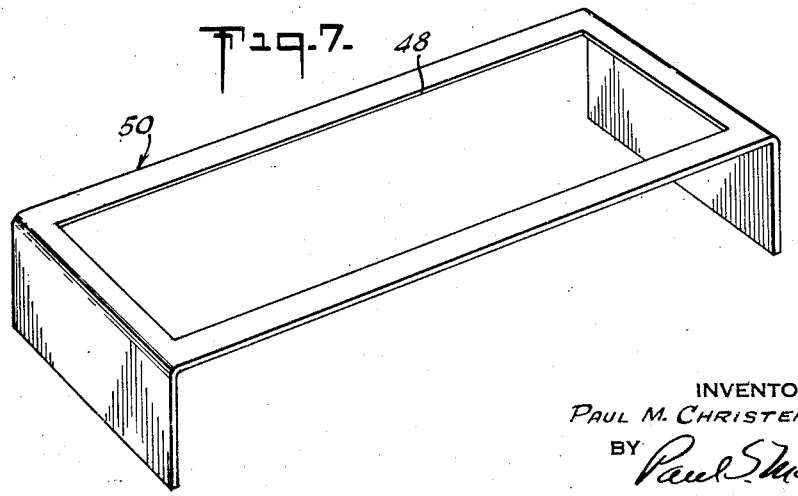

The present invention relates to bus duct, in which electrical bus bars are enclosed in a protective duct and are insulated from each other and from the enclosing duct. The invention has special application to the plug-in form of bus duct. In use, terminals of an external plug-in device contact the bus bars of the duct, extending through openings in the duct wall. Plug-in bus ducts are disclosed, for example, in the U.S. Patent No. 2,306,353 issued to L. W. Cole on December 22, 1943. In that patent the openings in the enclosing duct are protected by insulation. Passages through the insulation extend to several bus bars, with insulation interposed between each of the bus bars and the others. This construction avoids exposure of a technician to the live bus bars, otherwise accessible through the openings in the duct, yet the terminals of the plug-in units are readily admitted. Various forms of insulators have been used for bus duct and for the plug-in form of bus duct, as for example in the aforementioned Cole patent.

The present invention has as its main object the provision of a novel form of bus duct, and, more specifically, novel insulating and supporting means for bus bars in bus duct. A further object is the provision of a new and improved form of insulating and supporting means for bus bars in bus duct, especially adapted to resist the severe mechanical shocks resulting from electrical short-circuits, more especially the provision of such insulation for plug-in bus duct.

In the illustrative embodiments of the invention detailed below, it will be seen that elements of molded plastic are shaped to receive and locate the several bus bars in the duct, these elements having greater mechanical shock resistance than the ceramic insulators usually used for bus bars; and non-carbonizing, arc resisting barriers are interposed between the molded elements. The insulators of molded plastic are well suited to withstand the mechanical stresses resulting from short circuit of the bus bars. However, such insulation is not ordinarily arc-resistant. It is commonly hygroscopic, and its surface insulation is relatively poor. If bus duct with simple plastic insulators is exposed to humid conditions, it would tend to produce flash-over between the bus bars, forming carbonized tracks. The novel insulation supporting the bus bars is formed of an assembly of separate molded parts as of the phenol or urea formaldehyde type with appropriate recesses for the bus bars; and each of these molded parts is separated from the next adjacent molded part by an interposed barrier of arc-resistant, non-carbonizable insulation, and the non-carbonizable material advantageously is vulcanized fibre board. In the illustrative embodiment described in detail below, the fibre board is keyed or mechanically locked to the molded bus bar insulators, so that even were there any moderate displacement of each of the molded insulator pieces away from the others, the insulation would remain in the assembly originally established. As a further feature of novelty, the molded members of insulation have surfaces which abut the arc-resistant carbonizable material, but those abutting surfaces are relieved inward of edges of the interposed arc-resistant insulation, so that the interposed arc-resistant material has a projecting flange free of contact with the molded insulators, whereby the possibility of a continuous carbonized path developing as a result of flashover is minimized. Furthermore, the interlocking structure which prevents the interposed insulation from shifting out of its assembled position as mentioned is arranged to prevent contact of any molded insulator with any other molded insulator. Each interposed barrier additionally is arranged to space each molded insulator out of contact with the companion molded insulator. The construction is free of any continuous surface of molded insulation from any bus bar to an adjacent bus bar across which tracking might develop when exposed to flash-over, or, stated otherwise, each barrier is disposed to interrupt any continuous path across the exposed surfaces of the molded blocks of insulation from each bus-bar locating recess to the other bus-bar locating recesses.

The nature of the invention will be better understood and further objects and features of novelty will be apparent from the following detailed disclosure of an illustrative embodiment shown in the accompanying drawings.

In the drawings

FIG. 1 is a fragmentary view of a bus duct with certain portions removed to reveal the insulation assemblies at various positions along the bus duct and with the duct wall showing at other portions of the figure so as to conceal insulator assemblies;

FIG. 2 is a cross section of the structure in FIG. 1 along the line 2—2 therein, drawn to larger scale, and with portions of the enclosing duct broken away;

FIG. 3 is a cross section of the bus duct in FIG. 1 along the line 3—3, larger in scale than FIG. 1 but somewhat smaller than that of FIG. 2;

FIG. 4 is a cross section of the bus duct in FIG. 1 along the line 4—4 therein, drawn to the scale of FIG. 3;

FIG. 5 is a fragmentary longitudinal cross section of the bus duct in FIG. 1 along the line 5—5 therein, drawn to the scale of FIG. 3;

FIG. 6 is an exploded perspective of a molded insulating member and a non-carbonizable separator forming parts of the insulation assembly in the embodiment of FIGS. 1 to 5; and FIG. 7 is a perspective view of a further non-carbonizable insulation element forming part of the insulation assembly in the embodiment of FIGS. 1 to 5.

Referring now to the drawings, there is seen a bus duct including a pair of top and bottom walls 10, 12, which are parallel and opposite each other, and a pair of side walls 14, which are also parallel and opposite each other. Flanges on walls 10, 12 and 14 are formed for interlocking and uniting with each other to constitute a rectangular metal duct for enclosing the bus bars 16. These bus bars are relatively broad and flat, with the wide faces parallel to each other and to side walls 14 of the bus duct. They are held in the assembly shown, spaced from each other and from the walls of the bus duct by the insulation assembly shown in the various figures. Each insulation assembly includes three molded blocks of insulation 18, 20 and 22 of shock-resistant material, such as a phenolformaldehyde molding composition and preferably, but not necessarily, a shock-resistant grade. As a class, the molded plastics used for electrical insulation are shock-resistant, in contrast to ceramic insulators; and in the trade certain molded plastics are of a special "shock-resistant" grade. Each of these molded pieces includes a recess 24 which (FIGS. 1 and 2) has a rib or series of ribs 24a. Ribs 24a project into the rubber or felt insulation 26 that is packed in the space between bus bars 16 and the passages or recesses which receive those bus bars. Ribs 24a prevent the insulation 26 from sliding relative to the molded parts 18, 20, 22 and along the bus bars 16.

Other molded plastics such as urea formaldehyde or hard or semi-hard rubber are also subject to surface carbonized tracking when exposed to flashover and may be substituted for the phenolic mentioned above; and it may be found desirable to omit cushioning elements 26, and in that event recesses 24 will be formed to fit close to the bus bars directly.

Each of the molded insulators 18 and 22 is seen in FIG. 2 (see also FIG. 6) as having a side surface 28 opposed to the center molded member 20. Insulating barriers 34 are interposed between members 18 and 20 and between members 20 and 22. Each side surface 28 has an interlock projection 30 which fits into a complementary opening 32 in an insulating barrier 34. Surrounding the projection 30 which enters the opening 32 in the barriers 34 is an abutting surface portion 36 formed in each insulator 18 and 22, and the peripheral limits of this abutting surface are confined well within the periphery of insulating separators 34. Those separators accordingly have a flange-like projection 38 extending beyond the abutting surfaces 36, and the same projecting flange 38 is evident between barriers 34 and abutting surfaces 40 formed on the side faces of the center molded insulator 20 where that insulator engages the insulating barriers 34.

If there were any tendency of a flash-over to develop with the arc following along the surface of molded members 18 and 20 from one bus bar to the next adjoining one, there would be very little tendency of the arc to enter the space between the flange 38 and the opposed portions of insulators 18 and 20, but instead the arc might be expected to leap across the edge of element 34. Such arc would hardly be damaging because of the nature of material 34 which does not carbonize when thus exposed to an arc. If a discharge developed, it might be expected to produce a carbonized track over the surface of each member 18 and 20, but subsequent breakdown would be prevented despite the existence of such carbonized path because of the barrier 34. If the arc should drive across the surfaces 36, 40 where the molded parts abut the barriers 34, there is still no possibility of a continuous carbonized path developing because of the space between the molded parts.

As shown in FIGS. 1, 2 and 5, the upper wall 10 of the duct has an opening 42 through which projecting portions 44 of each of the molded insulators 18, 20 and 22 extend, with suitable clearance being provided. Further along the bus duct, at a convenient distance from that represented by the cross section 2—2 in FIG. 1, another insulating assembly is shown identical in all respects to that in FIG. 2 but this insulating assembly projects through the bottom wall 12 of the bus duct as shown in FIGS. 4 and 5. The insulating assemblies extend through openings 42 in the opposite walls 10 and 12, alternately extending through the top wall 10 and the bottom wall 12 of the bus duct. This alternate positioning of insulator assemblies, where one insulator assembly projects through upper casing wall 10 and the next one extends through the bottom of casing 12, is best shown in FIG. 1, where four insulator assemblies appear. As represented by the broken-away portions of the bus duct, the assemblies are spaced apart much farther than is represented in the drawing. In FIG. 1 the casing is represented normally in relation to the uppermost and lowermost insulator assembly shown, but the cover is broken away to reveal the other two insulator assemblies. In FIG. 1 this is shown in plain view, with the center portion of the drawing, shown with the casing removed, revealing one set of insulators above the center of the view as of the form that projects through the bottom wall of the casing where the second insulator assembly from the bottom of the view is positioned to project through an opening in the top wall of the duct. As seen in FIG. 2 the set of molded insulators 18, 20 and 22 project not only through the opening 42 in the upper wall 10 of the bus duct, but also through an opening 48 in an insulator frame 50 of vulcanized fibre board or the like which separates the set of insulators 18, 20 and 22 from the top bus duct wall and the opposite pair of side walls 14, of the enclosing duct. In FIG. 4 member 50 separates the set insulating members 18, 20 and 22 from the lower wall 12 of the bus duct and from side walls 14. The insulator assembly is largely a rigid assembly, the insulation (apart from insulating elements 26) being shock-resistant and, by design, dimensioned to substantially pack tightly in the bus, filling the space between side walls 14. Also, bus bars 16 confine the alternate insulation assemblies against the respective top and bottom walls 10 and 12 of the bus duct. Conversely, the insulator assemblies, alternating above and below the bus bars 16, support the bus bars against both up-and-down and side-to-side shifting.

The electrical insulation between the bus bars is excellent, especially because of the arc-resistant wafers 34 that break the surface path between the separate bus supporting elements 18, 20 and 22; and the resistance of the bus bar assembly to mechanical shock resulting from short-circuit is also excellent. Short circuits may occur asymmetrically between any two of the bars, or it may occur across all three bus bars. Short circuit currents tend to develop repelling forces between adjacent bus bars, and this is a stress that is imposed on the supporting insulation assembly. Were the members comparable to molded insulators 18, 20 and 22 formed of a unitary ceramic or equivalent molded non-carbonizing material, there would be a strong tendency of the insulator to fracture. Instead, the molded parts are here formed of material which is not relied upon for arc resistance but it not fragile. The separate molded parts are packed tightly together, but since they are separate elements, any shifting apart in response to short-circuit stresses does not cause fracture such as might result with a unitary insulator. There is the possibility of some relative shifting of the insulation members 18 and 20 in the direction to separate those insulators, and for this reason the interlock 30, 32 is important, giving assurance that the elements 34 will remain in place after the short circuit stresses have been relieved and despite the possible limited shifting of the molded insulators away from each other.

The insulators 18, 20, and 22 are seen to have a number of recesses 52 formed there in of various configurations. These are shaped and located to minimize the bulk of the insulating material used, in a manner not to impair the strength of the insulators.

The invention may be employed in connection with other materials than those specified, and in other applications. Thus, while the present disclosure is particularly concerned with plug-in bus duct, in which application the invention has special merit, broader aspects of the invention will be recognized by those skilled in the art. Because of the evident variations in detail, and the varied applications of the invention that are possible, it is appropriate that the invention be broadly construed in a manner consistent with its spirit and scope.

What is claimed is:

1. A bus duct including an enclosing wall structure, multiple bus bars contained therein, and an insulator assembly supporting said bus bars spaced from each other, said insulator assembly including a row of molded blocks of shock-resistant insulation subject to carbonized tracking when exposed to flash-over, each of said blocks having opposed surfaces and lateral surfaces transverse to said opposed surfaces, said lateral surfaces having recesses receiving and locating said bus bars, and at least certain of said opposed surfaces having a raised interlock portion, and wafers of non-carbonizing insulation disposed between said opposed surfaces and framed about said interlock portions of the molded blocks and disposed to interrupt any continuous path across the exposed surfaces of said blocks from each one of said bus bar receiving recesses to all others of said recesses.

2. A bus duct including an enclosing wall structure, multiple bus bars contained therein and an insulator assembly supporting said bus bars spaced from each other, said insulator assembly including a row of molded blocks of phenolic insulation, each of said blocks having opposed surfaces and lateral surfaces transverse to said opposed surfaces, said lateral surfaces having recesses receiving and locating said bus bars, and at least certain of said opposed surfaces having a raised interlock portion, and wafers of non-carbonizing insulation disposed between said opposed surfaces and framed about said interlock portions of the molded blocks, the thickness of said wafers being greater than the height of said raised portions, so that said blocks are spaced out of contact with each other.

3. A bus duct including an enclosing wall structure, multiple bus bars contained therein and an insulator assembly supporting said bus bars spaced from each other, said insulator assembly including a row of molded blocks of shock-resistant insulation subject to carbonized tracking when exposed to flash-over, said blocks having opposed surfaces and having lateral surfaces transverse to said opposed surfaces, said lateral surfaces having recesses receiving and locating said bus bars, said opposed surfaces having raised abutments and at least certain of said opposed surfaces having interlock portions projecting beyond said abutments, and members of non-carbonizing insulation confined between the abutments of opposed molded blocks and disposed to interrupt any continuous path across the exposed surfaces of said blocks from each one of said bus bar receiving recesses to all others of said recesses and formed with openings receiving said interlock portions.

4. A bus duct including an enclosing metal wall structure, multiple bus bars contained therein and an insulator assembly supporting said bus bars spaced from each other and from said wall structure, said insulator assembly including a row of molded blocks of shock-resistant insulation subject to carbonized tracking when exposed to flash-over, said blocks having opposed surfaces and having lateral surfaces transverse to said opposed surfaces, said lateral surfaces having recesses receiving and locating said bus bars, and said opposed surfaces having raised abutments, and at least certain of said opposed surfaces having interlock portions projecting beyond said abutments, member of non-carbonizing insulation confined between the abutments of opposed molded blocks and disposed to interrupt any continuous path across the exposed surfaces of said blocks from each one of said bus bar receiving recesses to all others of said recesses and formed with openings receiving said interlock portions, and a layer of non-carbonizing insulation interposed between said row of insulating blocks and the enclosing metal wall structure.

5. A bus duct including an enclosing metal wall structure, multiple bus bars contained therein and an insulator assembly supporting said bus bars spaced from each other and from said wall structure, said insulator assembly including a row of molded blocks of shock-resistant insulation subject to carbonized tracking when exposed to flash-over, each of said blocks having opposed surfaces and having lateral surfaces transverse to said opposed surfaces, said lateral surfaces having recesses receiving and locating said bus bars, and said opposed surfaces having raised abutments, and at least certain of said opposed surfaces having interlock portions projecting beyond said abutments, and insulating members of vulcanized fibre board confined between the abutments of opposed molded blocks and disposed to interrupt any continuous path across the exposed surfaces of said blocks from each one of said bus bar receiving recesses to all others of said recesses and formed with openings receiving said interlock portions, and an insulating layer of vulcanized fibre board interposed between said row of insulating blocks and the enclosing metal wall structure and framed about said passages.

6. An assembly of insulators for supporting bus bars within a metal enclosing duct, said insulator assembly including a row of molded shock-resistant insulation subject to carbonized tracking when exposed to flash-over blocks having opposed surfaces and having lateral surfaces, said lateral surfaces having recesses for receiving and locating bus bars, and certain of said opposed surfaces having interlock projections, and members of non-carbonizing insulation interposed between the opposed surfaces of said row of insulating blocks and disposed to interrupt any continuous path across the exposed surfaces of said blocks from each one of said bus bar receiving recesses to all other of said recesses, and having complementary apertures receiving said projections, respectively.

7. An assembly of insulators for supporting bus bars within a metal enclosing duct, said insulator assembly including a row of insulating molded phenolic blocks having opposed surfaces and having lateral surfaces, said lateral surfaces having recesses for receiving and locating bus bars, said opposed surfaces having abutment areas, and wafers of vulcanized fibre board interposed between the abutments of the opposed surfaces of said row of insulating blocks, said wafers and said molded blocks having mutually interengaging and interlocking mechanical formations for retention of said wafers, the thickness of said wafers being greater than the height of said interlocking portions of said blocks so that the wafers provide separation between said blocks, said wafers extending as a free flange beyond the abutment areas.

8. A bus duct including an enclosing metal wall structure, multiple bus bars contained therein, and an insulator assembly supporting said bus bars spaced from each other and from said wall structure, said bus bars being disposed in successive parallel planes, said insulator assembly comprising multiple molded blocks of phenolic shock-resistant insulation, each of said blocks of insulation having only one formation therein to receive edgewise and locate only one of said bus bars, said assembly of molded blocks being disposed with the respective formations thereof in a row for receiving the respective bus bars in the successive planes, and respective sheet members of non-carbonizing insulation assembled to said molded blocks so as to separate said blocks from each other and from said wall structure, said sheet members and said molded blocks having mutually interengaging formations providing mechanical retention of the sheet members in assembly to said molded blocks.

9. A bus duct including an enclosing metal wall structure, multiple bus bars contained therein, and an insulator assembly supporting said bus bars spaced from each other and from said wall structure, said bus bars being disposed in successive parallel planes, said insulator assembly comprising multiple molded blocks of phenolic shock-resistant insulation, each of said blocks of insulation having only one formation therein to receive edgewise and locate only one of said bus bars, said assembly of molded blocks being disposed with the respective formations thereof in a row for receiving the respective bus bars in the successive planes, and respective sheet members of non-carbonizing insulation assembled to said molded blocks so as to separate said blocks from each other and from said wall structure, said sheet members and said molded blocks having mutually interengaging formations providing mechanical retention of the sheet members in assembly to said molded blocks, said insulator assembly being tightly confined within said wall structure, and both said non-carbonizing insulation and said molded insulators being of relatively fixed form.

References Cited in the file of this patent

UNITED STATES PATENTS

| | | |
|---|---|---|
| 1,970,125 | Burnham | Aug. 14, 1934 |
| 2,186,377 | Frank | Jan. 9, 1940 |
| 2,201,743 | Peterson | May 21, 1940 |
| 2,240,007 | Power | Apr. 29, 1941 |
| 2,306,353 | Cole | Dec. 22, 1942 |

(Other references on following page)

UNITED STATES PATENTS

| | | |
|---|---|---|
| 2,310,919 | Adam | Feb. 16, 1943 |
| 2,439,956 | Wagner et al. | Apr. 20, 1948 |
| 2,482,310 | Adam | Sept. 20, 1949 |
| 2,532,845 | Jensen | Dec. 5, 1950 |
| 2,722,670 | Oliver | Nov. 1, 1955 |
| 2,733,289 | Warren et al. | Jan. 31, 1956 |
| 2,837,699 | Fore | June 3, 1958 |
| 2,868,864 | Page | Jan. 13, 1959 |
| 2,881,242 | Kron | Apr. 7, 1959 |

FOREIGN PATENTS

| | | |
|---|---|---|
| 458,057 | Canada | July 12, 1949 |